US008865197B2

(12) United States Patent
Tandler et al.

(10) Patent No.: US 8,865,197 B2
(45) Date of Patent: Oct. 21, 2014

(54) FOOD FORMULATION FOR AQUATIC ANIMALS WITH INTEGRATED TARGETED DELIVERY OF BIOACTIVE AGENTS

(75) Inventors: Amos Tandler, Eilat (IL); William Koven, Eilat (IL); Shalom Zemach, Kfar Yona (IL)

(73) Assignee: Israel Oceanographic and Limnological Research Ltd., Haifa (IL)

( * ) Notice: Subject to any disclaimer, the term of this patent is extended or adjusted under 35 U.S.C. 154(b) by 1516 days.

(21) Appl. No.: 11/218,781

(22) Filed: Sep. 6, 2005

(65) Prior Publication Data

US 2007/0053956 A1 Mar. 8, 2007

(51) Int. Cl.
| | |
|---|---|
| *A01N 25/08* | (2006.01) |
| *A01N 25/00* | (2006.01) |
| *A01N 25/24* | (2006.01) |
| *A01N 25/34* | (2006.01) |
| *A01K 97/04* | (2006.01) |
| *A23J 1/00* | (2006.01) |
| *A61K 31/56* | (2006.01) |
| *A61K 31/54* | (2006.01) |
| *A61K 31/19* | (2006.01) |
| *A23K 1/00* | (2006.01) |
| *A23K 1/18* | (2006.01) |
| *A23K 1/16* | (2006.01) |
| *A23K 1/17* | (2006.01) |

(52) U.S. Cl.
CPC .............. *A23K 1/188* (2013.01); *A23K 1/004* (2013.01); *A23K 1/1634* (2013.01); *A23K 1/164* (2013.01); *A23K 1/17* (2013.01)
USPC ........... 424/410; 424/405; 424/407; 424/408; 424/409; 424/442; 426/1; 426/656; 514/182; 514/225.2; 514/568; 514/557

(58) Field of Classification Search
None
See application file for complete search history.

(56) References Cited

U.S. PATENT DOCUMENTS

| | | | |
|---|---|---|---|
| 4,349,530 A | 9/1982 | Royer | |
| 4,695,466 A | 9/1987 | Morishita et al. | |

(Continued)

FOREIGN PATENT DOCUMENTS

| | | |
|---|---|---|
| EP | 0237 542 | 1/1991 |
| GB | 2040863 | 3/1980 |

(Continued)

OTHER PUBLICATIONS

Hertz et al., J. Comparative Physiology B, (1991) 161: 159-163.*

(Continued)

*Primary Examiner* — Jeffrey T Palenik
(74) *Attorney, Agent, or Firm* — Mark M. Friedman

(57) ABSTRACT

An encapsulated formulation for food and bioactive agent delivery to aquatic animals includes various combinations of nutrients, a digestion enhancer, bioactive agents, and a local absorption enhancer. The bioactive agents and absorption enhancer may be encapsulated within a delay layer for targeted release at an area of the digestive tract distinct from the region of nutrient release. The bioactive agents and absorption enhancer may be coated with a sticky coating so that they tend to adhere to the inner surfaces of the wall of the digestive tract, thereby localizing their release and enhancing their effect. Instead of bioactive agents themselves, precursors may be delivered so as to generate the bioactive agents locally. The encapsulated precursors of a specific bioactive agent are separately contained in capsules which themselves can be adhesive to one another.

25 Claims, 4 Drawing Sheets

(56) References Cited

U.S. PATENT DOCUMENTS

| | | | |
|---|---|---|---|
| 4,726,951 | A | 2/1988 | Panoz et al. |
| 4,798,786 | A | 1/1989 | Tice et al. |
| 4,904,476 | A | 2/1990 | Mehta et al. |
| 5,030,657 | A | 7/1991 | Burtle et al. |
| 5,064,736 | A | 11/1991 | Grosso et al. |
| 5,126,147 | A | 6/1992 | Silvestri et al. |
| 5,151,264 | A | 9/1992 | Samain et al. |
| 5,158,788 | A | 10/1992 | Lavens et al. |
| 5,185,226 | A | 2/1993 | Grosso et al. |
| 5,260,071 | A | 11/1993 | Lemelson |
| 5,288,705 | A * | 2/1994 | Zohar .................. 514/9.8 |
| 5,401,512 | A | 3/1995 | Rhodes et al. |
| 5,698,246 | A | 12/1997 | Villamar |
| 5,871,774 | A | 2/1999 | Lemelson |
| 5,965,117 | A * | 10/1999 | Howard et al. ............ 424/78.26 |
| 6,207,197 | B1 | 3/2001 | Illum et al. |
| 6,261,537 | B1 * | 7/2001 | Klaveness et al. ........... 424/9.52 |
| 6,350,468 | B1 | 2/2002 | Sanso |
| 6,426,089 | B1 | 7/2002 | Sunohara et al. |
| 6,544,555 | B2 | 4/2003 | Rudnic |
| 6,555,136 | B2 | 4/2003 | Midha |
| 6,574,214 | B1 | 6/2003 | Khalil et al. |
| 6,623,776 | B1 | 9/2003 | Wathne et al. |
| 6,723,341 | B2 | 4/2004 | Rudnic et al. |
| 2002/0044968 | A1 * | 4/2002 | van Lengerich ............. 424/469 |
| 2003/0050620 | A1 | 3/2003 | Odidi et al. |
| 2003/0118547 | A1 * | 6/2003 | Vandenberg ................. 424/85.4 |
| 2003/0124196 | A1 * | 7/2003 | Weinbach et al. ............ 424/499 |
| 2003/0150832 | A1 | 8/2003 | Bakhashaee et al. |
| 2003/0152627 | A1 | 8/2003 | Beckert et al. |
| 2004/0028613 | A1 * | 2/2004 | Quay .............................. 424/45 |

FOREIGN PATENT DOCUMENTS

| | | |
|---|---|---|
| GB | 2374149 | 10/2002 |
| WO | WO00/27218 | 5/2000 |
| WO | WO01/13898 | 3/2001 |
| WO | PCT/2004043140 | 5/2004 |

OTHER PUBLICATIONS

U.S. Patent Documents—none.*
Non-Patent Documents—non.*
"Differential Adhesion of Normal and Inflamed Rat Colonic Mucosa by Charged Liposomes" ; T. Jubeh, Y. Barenholz, A. Rubenstein Jubeh, T.T., et al., Pharmaceutical Research vol. 21, Issue 3, Mar. 2004 (pp. 447-453).
Koven et al. (2002) (Marine Biology, vol. 140, Issue 6, Jun. 2002, pp. 1241-1247.
Francesco Argenton et al., "A TGACG Motif Mediates Growth-Hormone—Factor-1/Pituatory-Transcriptional—Activator-1-Dependent CAMP Regulation of the Rainbow Trout Growth-Hormone Promoter" Eur.J. Biochem 238,591-598 (1996).
"Preparation of Recombinant Giltead Seabream et al."Gen. Comp. Endocrinol 113 (1):155-64; Atia , Fine, Tandler, Funkenstein, Maurice, Cavari, Gertler (1999).
"Gene Expression in Tilapia Following Oral Delivery of Chitosan-Encapsulated Plasmid DNA et al." ; National Institute of Molecular Biology and Biotechnology; vol. 7, 89-94 (2005) by: Ramos, Relucio and Torres-Villaneuva.
"Oral Gene Delivery With Chitosan et al"; K. Roy, MH. Mao, K. Leong ; Nature Medicine—vol. 5, No. 4, Apr. 1999.
Bailey and Cullis (Biochemistry Feb. 1997 18:36(7): 1628-34).
Miron, Mironchik, Mirelman, Wilchek and Rabinkov, "Inhibition of Tumor Growth by a novel Approach et al.".
Cavallito and Bailey, "Allicin, the Antibacterial Principle of Alluim *Sativum* et al."

* cited by examiner

FIG. 2
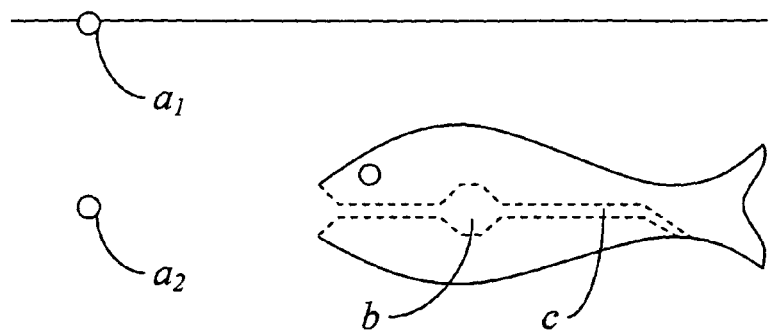
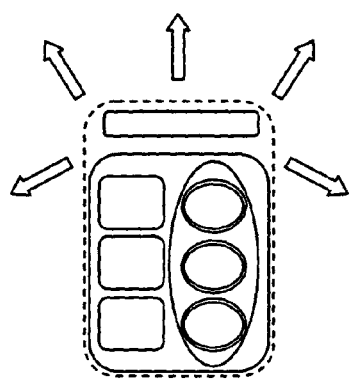
FIG. 3A
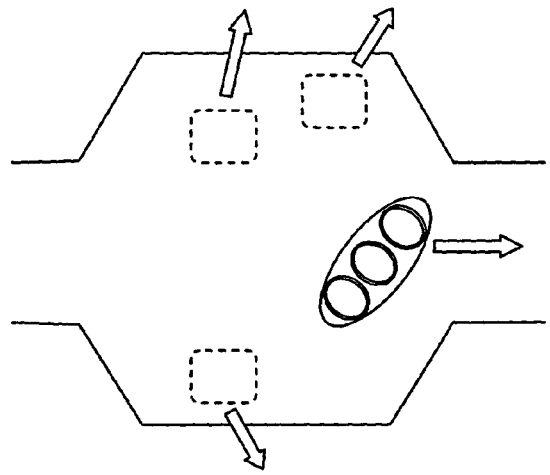
FIG. 3B
FIG. 3C

Capsule after single encapsulation (50-150μm)

Double encapsulation of single capsules (200-450 μm)

FIG. 5

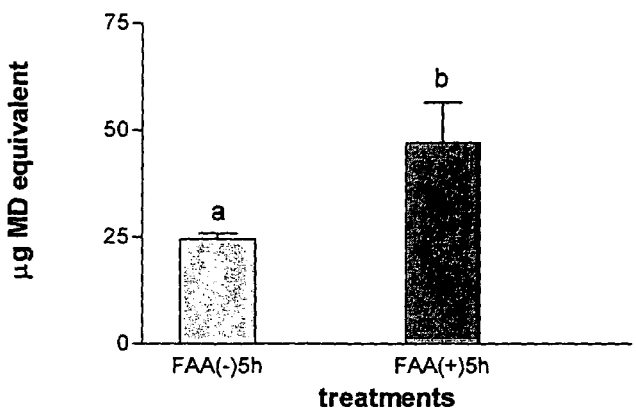

The effect of dietary FAA on the accumulation of radioactivity (μg MD equivalent) from dietary $^{14}$C-triacylglycerol in the PL and predominantly protein fractions of the tissues. Values having different letters were significantly (P<0.05) different.

FIG. 6

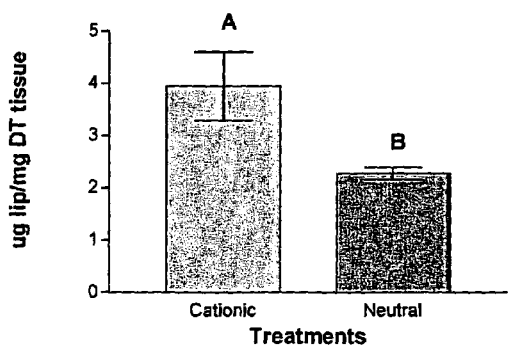

Comparing the adherence of cationic and neutral liposomes to the digestive tract mucosa (μg lipid/mg DT tissue). Values having different letters were significantly (p<0.05) different.

FOOD FORMULATION FOR AQUATIC ANIMALS WITH INTEGRATED TARGETED DELIVERY OF BIOACTIVE AGENTS

FIELD AND BACKGROUND OF THE INVENTION

The present invention relates to farming of aquatic animals and, in particular, it concerns a food formulation for aquatic animals with integrated targeted delivery of bioactive agents.

Considerable effort has been made to develop a formulated feed for aquatic animals to replace live feed. This is due to a number of disadvantages associated with live feed such as: challenges in cultivation, variable supply due to periodic and sometimes low hatching, variable nutritional composition, risk of transferring diseases and overall cost. A suitable replacement, which would result in survival and growth rates comparable with live feed, has yet to be developed. The lack of adequate formulated feed for aquatic animals, as a substitute for live feed, is a substantial hindrance for the development of the industry of fish farming.

In addition, there is a great need in aquaculture to develop a method of mass immunization, as well as administration of growth enhancing bioactive molecules. Presently, the most effective method available to administer bioactive macromolecules, such as growth hormones or vaccines, is by injection. It is self evident that this is impractical with fish larvae. Oral administration through formulated feed is generally precluded because conventional feeds rapidly deteriorate in water with physical decomposition. Consequently, vulnerable bioactive molecules start to breakdown, and can then be destroyed before they are even subject to the biological, chemical and physical gastrointestinal tract processes.

Turning now to the field of drug delivery in mammals, polymerized, microencapsulated, and polymer-coated liposomes, as well as other lipid particulate carriers are known in the art as potential carriers via the oral route. The most important contribution of oral particulate carriers is in their ability to protect their contents until direct release in time and place, thereby maximizing efficacy. Various methods have been proposed in the prior art to achieve retention and increased absorption, including dosage forms which display extended residence along the gastrointestinal tract due to their density, size, or use of mechanisms based on pH or bioadhesion.

While cationic liposomes have been shown to adhere to the digestive tract mucosa in mammalian studies such as rat (Jubeh, T. T., et al., Pharmaceutical Research, Volume 21, Issue 3, March 2004, Pages 447-453) and human, no studies have considered its efficacy in adult and larval aquatic animals. Although the mucosa in both fish and mammals are similar, it is not self evident that liposomes in the digestive tract of fish, would adhere to the mucosa just as readily as in mammals. The membrane fatty acid composition of mammalian digestive tract mucosa and fish digestive tract mucosa can differ significantly in polyunsaturated fatty acid content. Bailey and Cullis (Biochemistry. 1997 Feb. 18;36(7):1628-34) reported that membrane fusion with cationic liposomes is markedly affected by membrane lipid composition. In addition, due to the significant difference in body temperature of mammals, being warm blooded (about 37° C.), and fish, being cold blooded, there is an anticipated adjustment in the physical-chemical properties of the liposome membrane. This would be the case whether the liposomes are made up of hydrogenated polar lipids, where the transition temperature is known to be high or of monounsaturated or polyunsaturated moiety, which have much lower transition temperatures, both studied in mammals.

Even once delivery of the molecules is achieved, the prior art compositions have generally proved deficient in inducing increased absorption by the digestive system of bioactive macromolecules.

In aquatic animals, formulated feed is added to the aquaculture system or mixed with water prior to use and begins to decompose, even before entering the digestive system of the organism. One method for overcoming some of these disadvantages has been the application of microencapsulated diets. WATHNE (PCT WO 00/27218) discloses a formulated feed for aquatic organisms which is both stable so as to prevent leakage of water soluble nutrients and easily digestible to larvae. It is able to contain both water soluble and insoluble nutrients. Harel (PCTA 04043140 (2004)) discloses a method of protection of the bioactive compounds and microbes from digestion and destruction by the digestive system of aquatic organism as well as controlled release.

However, microencapsulated feed for aquatic animals described in the prior art is limited to advances in appropriate delivery vehicles. The prior art is still deficient in providing factors which sequentially prime key elements of the digestive tract for improved efficiency in digestion, absorption, and assimilation. It will be appreciated for those well versed in the art, if a product can be provided which include these factors, thereby improving growth and health management and providing an economical and high performance alternative for live feed in commercial hatcheries.

Koven et al. (2002) (Marine Biology, Volume 140, Issue 6, June 2002, Pages 1241-1247) studied ingestion of liposomes that contained soluble proteins such as bovine serum albumin (BSA) and specific Free Amino Acids (FAA) by first feeding herring larvae (Clupea harengus). Ingestion of these liposomes was associated with stimulation of significantly higher levels of cholecystokinin (CCK), a digestive hormone acting on the gall bladder, pancreas and vagal neurons. However, it was not demonstrated that these FAA directly improve assimilation of lipids and proteins.

There is therefore a need for a food formulation for aquatic animals which would enable integrated targeted delivery of bioactive agents, and which would enhance absorption both of the nutrients and the bioactive agents of the formulation.

SUMMARY OF THE INVENTION

The present invention is a food formulation for aquatic animals.

According to the teachings of the present invention there is provided, a food formulation for aquatic animals comprising: (a) at least one encapsulated nutritional substance; and (b) an encapsulated digestion enhancing composition effective to trigger enhancement of at least one digestive process in the aquatic animal, wherein the nutritional substance and the digestion enhancing composition are encapsulated in at least one protective layer so as to protect the nutritional substance and the digestion enhancing composition until the nutritional substance and the digestion enhancing composition reach a designated area of the digestive tract of the aquatic animal, the digestion enhancing composition and the at least one nutritional substance then being released and the digestion enhancing composition thereby enhancing absorption of the at least one nutritional substance.

According to a further feature of the present invention, the nutritional substance and the digestion enhancing composition are both enclosed in at least one common encapsulating layer.

According to a further feature of the present invention, the digestion enhancing composition comprises at least one free amino acid.

According to a further feature of the present invention, the digestion enhancing composition comprises at least one polar lipid.

According to a further feature of the present invention, the digestion enhancing composition comprises at least one free fatty acid.

According to a further feature of the present invention, there is also provided an appetite stimulating composition associated with the protective layer so as to be released into water surrounding the food formulation, thereby encouraging ingestion of the food formulation by the aquatic animal.

According to a further feature of the present invention, the appetite stimulating composition comprises at least one free amino acid.

According to a further feature of the present invention, the appetite stimulating composition comprises at least one polar lipid.

According to a further feature of the present invention, the appetite stimulating composition comprises at least one free fatty acid.

According to a further feature of the present invention, the appetite stimulating composition is dispersed within the protective layer.

According to a further feature of the present invention, the protective layer has a maximum external dimension in the range between 10 and 1000 microns.

According to a further feature of the present invention, there is also provided at least one buoyancy modifying particle disposed within the protective layer, the buoyancy modifying particle being chosen such that the food formulation exhibits a predefined degree of buoyancy in water.

According to a further feature of the present invention, the at least one buoyancy modifying particle includes a hollow glass ball.

According to a further feature of the present invention, the at least one buoyancy modifying particle includes a quantity of trapped gas.

According to a further feature of the present invention, the predefined degree of buoyancy is positive buoyancy such that the food formulation floats in water.

According to a further feature of the present invention, the predefined degree of buoyancy is substantially neutral buoyancy such that the food formulation remains suspended in water.

According to a further feature of the present invention, the predefined degree of buoyancy is negative buoyancy such that the food formulation sinks in water. According to a further feature of the present invention, there is also provided a quantity of at least one bioactive agent.

According to a further feature of the present invention, the digestion enhancing composition triggers a cascade reaction enhancing digestion along a major part of the digestive tract of the aquatic animal, thereby enhancing absorption of the bioactive agent.

According to a further feature of the present invention, there is also provided a sticky coating associated with at least part of the quantity of bioactive agent, the sticky coating being configured such that, when exposed, the sticky coating tends to adhere to an internal surface of the digestive tract, thereby localizing release of the at least part of the quantity of bioactive agent.

According to a further feature of the present invention, there is also provided a delay layer encapsulating the sticky coating, the delay layer being configured to delay exposure of the sticky coating after breaching of the protective layer such that the at least one nutritional substance is released prior to exposure of the sticky layer.

According to a further feature of the present invention, there is also provided a local absorption enhancer for enhancing transport of the bioactive agent through a wall of the digestive tract.

According to a further feature of the present invention, there are also provided sticky coatings associated with each of the bioactive agent and the local absorption enhancer, the sticky coatings being configured such that, when exposed, the sticky coatings tend to adhere to an internal surface of the digestive tract, thereby localizing release of the bioactive agent and the local absorption enhancer.

According to a further feature of the present invention, there is also provided at least one delay layer encapsulating the sticky coatings, the at least one delay layer being configured to delay exposure of the sticky coatings after breaching of the protective layer such that the nutritional substance is released prior to exposure of the sticky coatings.

According to a further feature of the present invention, there is also provided a delay layer encapsulating the bioactive agent, the delay layer being configured to delay release of the bioactive agent such that the digestion enhancing composition is released at a first area within the digestive tract and the bioactive agent is released subsequently at a second area within the digestive tract.

According to a further feature of the present invention, there is also provided a quantity of at least two bioactive agent precursors each encapsulated by a sealing layer, the bioactive agent precursors combining on breaching of the sealing layers to form a bioactive agent.

There is also provided according to the teachings of the present invention, a bioactive formulation for aquatic animals comprising: (a) at least one encapsulated bioactive agent; and (b) an encapsulated digestion enhancing composition effective to trigger a cascade reaction enhancing digestion along a major part of the digestive tract of the aquatic animal, wherein the bioactive agent and the digestion enhancing composition are encapsulated in at least one protective layer so as to protect the bioactive agent and the digestion enhancing composition until the bioactive agent and the digestion enhancing composition reach a designated area of the digestive tract of the aquatic animal, the digestion enhancing composition then being released and thereby enhancing absorption of the bioactive agent.

According to a further feature of the present invention, the encapsulation of the bioactive agent includes a delay layer configured to delay release of the bioactive agent such that the digestion enhancing composition is released at a first area within the digestive tract and the bioactive agent is released subsequently at a second area within the digestive tract.

According to a further feature of the present invention, the encapsulation of the bioactive agent further includes a sticky coating initially disposed under the delay layer, the sticky coating being configured such that, when exposed, the sticky coating tends to adhere to an internal surface of the digestive tract, thereby localizing release of the bioactive agent.

According to a further feature of the present invention, there is also provided a local absorption enhancer for enhancing transport of the bioactive agent through a wall of the digestive tract.

According to a further feature of the present invention, there is also provided at least one nutrient present in sufficient quantity to render the bioactive formulation of nutritional value to the aquatic animal.

There is also provided according to the teachings of the present invention, a bioactive formulation for aquatic animals comprising a quantity of at least two bioactive agent precursors each encapsulated by a sealing layer, the bioactive agent precursors combining on breaching of the sealing layers to form a bioactive agent.

According to a further feature of the present invention, the encapsulation of the bioactive agent precursors further includes a sticky coating initially disposed on each of the bioactive agent precursors under the sealing layer, the sticky coating being configured such that, when exposed, the sticky coating tends to adhere to an internal surface of the digestive tract, thereby localizing release of the bioactive agent precursors.

According to a further feature of the present invention, the sealing layers of the two bioactive agent precursors are configured to exhibit opposite electrostatic charges such that the sealing layers tend to adhere to each other, thereby enhancing proximity of release of the bioactive agent precursors.

According to a further feature of the present invention, there is also provided an absorption enhancer effective to trigger a cascade reaction enhancing digestion along a major part of the digestive tract of the aquatic animal, thereby enhancing absorption of the bioactive agent.

According to a further feature of the present invention, there is also provided a local absorption enhancer for enhancing transport of the bioactive agent through a wall of the digestive tract.

According to a further feature of the present invention, there is also provided at least one nutrient present in sufficient quantity to render the bioactive formulation of nutritional value to the aquatic animal.

There is also provided according to the teachings of the present invention, a bioactive formulation for aquatic animals comprising: (a) at least one encapsulated bioactive agent; and (b) an encapsulated quantity of deoxycholic acid (DOC), wherein the bioactive agent and the quantity of DOC are encapsulated in at least one protective layer so as to protect the bioactive agent and the quantity of DOC until the bioactive agent and the quantity of DOC reach a designated area of the digestive tract of the aquatic animal, the quantity of DOC then being released and thereby enhancing absorption of the bioactive agent.

BRIEF DESCRIPTION OF THE DRAWINGS

The invention is herein described, by way of example only, with reference to the accompanying drawings, wherein:

FIG. 2 is a schematic representation of an aquatic animal in water illustrating various locations at which certain properties of the formulation of FIG. 1 are exhibited;

FIGS. 3A, 3B and 3C are schematic representations of the formulation of FIG. 1 illustrating three stages of release of contents of the formulation occurring at locations $a_1$ or $a_2$, b and c from FIG. 2, respectively;

FIG. 5 is a graph illustrating the effect of dietary free amino acids (FAA) on digestion and absorption of ingested dietary lipids 5 h after feeding; and FIG. 6 is a graph illustrating the degree of adhesion of cationic liposomes compared to neutral liposomes to the mucosa of the digestive tract.

DESCRIPTION OF THE PREFERRED EMBODIMENTS

The present invention is a food formulation for aquatic animals which enables integrated targeted delivery of bioactive agents, and which enhances absorption of the nutrients and/or of the bioactive agents of the formulation.

The principles and operation of formulations according to the present invention may be better understood with reference to the drawings and the accompanying description.

By way of introduction, it should be noted that preferred implementations of the present invention incorporate a number of aspects each of which is believed to be of patentable significance in its own right, but which are advantageously combined with particular synergy to provide a highly effective combination. Specifically, according to a first aspect, the invention provides a food formulation which combines nutritional substances and bioactive agents encapsulated within a single product so as to achieve staged delivery of the nutritional substances to a first stage of the digestive tract (such as the stomach region or foregut) and of the bioactive agents to a second stage of the digestive tract (such as the intestinal region or hindgut). According to a second aspect of the invention, a digestion enhancing composition is combined in the formulation for release within one part of the digestive tract to enhance digestion and absorption of the nutritional substances at the same part, or in another part, of the digestive tract. According to a third aspect of the invention, digestion enhancing compositions may be used to generate a cascade effect which enhances absorption of bioactive agents, either at the same location or in another area of the digestive tract. According to a fourth aspect of the invention, enhanced targeted delivery of the bioactive agents is achieved by parallel delivery of a local absorption enhancing material which enhances absorption of the bioactive agent through the wall of the digestive tract. According to a fifth aspect of the invention, two or more bioactive agent precursors are delivered separately to a target region where they are exposed to each other, thereby generating the desired bioactive agent at or near a target region of the digestive tract. In addition to the above, various other features to be described below are believed to be patentable in their own right and may be claimed independently of the above mentioned aspects of the invention.

Figure 1:
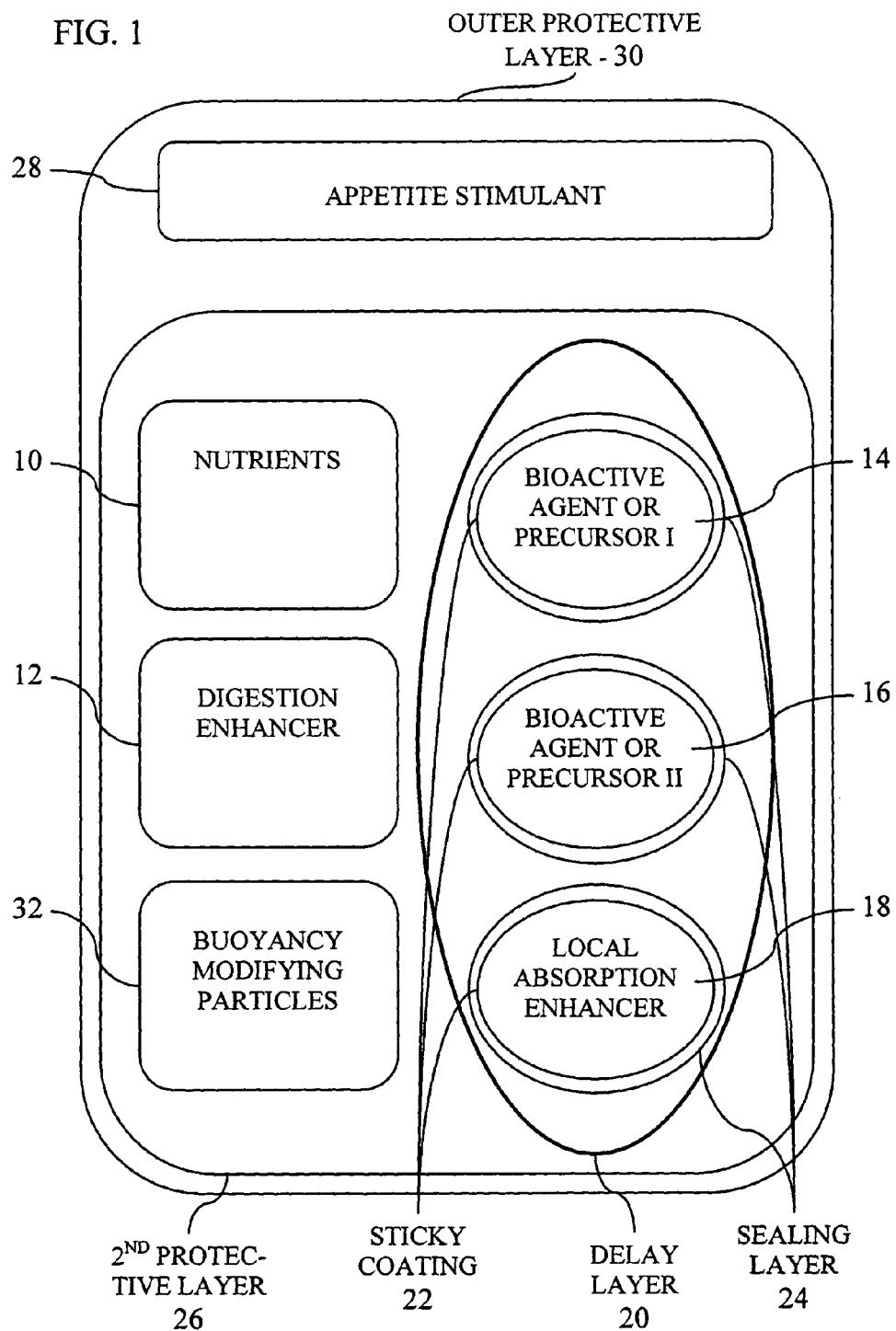
FIG. 1 is a schematic representation of a formulation for feeding and delivering bioactive agents to aquatic animals, constructed and operative according to the teachings of the present invention.

Referring now to the drawings, FIG. 1 shows a schematic representation of an encapsulated formulation for food and/or bioactive agent delivery, constructed and operative according to the teachings of the present invention, for feeding, nourishing, promoting growth and/or managing the health of aquatic animals. This formulation is a poly-encapsulated particle for oral administration to aquatic animals that will be used to illustrate the above-mentioned main aspects of the present invention. The particular example illustrated is a preferred example which will be used to describe substantially all of the aforementioned aspects of the invention. It will be understood that various simplified formulations with selective components omitted will be suitable for implementing various aspects of the invention individually as mentioned above. Thus, the formulation sequentially primes the olfactory senses and key sectors of the digestive tract that affect ingestion, digestion and absorption for improved growth and health management in aquatic animals.

Thus, in the preferred implementation illustrated, the food formulation includes a quantity of at least one nutritional substance 10, a digestion enhancer 12, a quantity of at least one bioactive agent 14, 16, and a local absorption enhancer 18. Where the nutritional substances and the bioactive agent(s) are intended for delivery to separate areas of the digestive tract, bioactive agents 14, 16 and absorption enhancer 18 are preferably encapsulated by a delay layer which may be implemented as either or both of a common delay layer 20 encapsulating the bioactive agents and the absorption enhancer as shown, or separate sealing layers encapsulating each component separately. In certain preferred embodiments, the delay layer is formed from material which has pH-dependent solubility chosen so as to dissolve and release its contents when exposed to a pH level anticipated in the target area of the digestive tract of the target population of aquatic animals. According to a further particularly preferred feature, one or more of the bioactive agents 14, 16 and absorption enhancer 18 may be encapsulated with a sticky coating 22 initially protected by a sealing layer 24. Once exposed, this sticky coating allows the capsule containing bioactive agents and absorption enhancer to adhere to the mucosa lining the inner surfaces of the wall of the digestive tract, thereby localizing their release and enhancing their effect.

In order to render the entire formulation appropriate for aquatic animals, the aforementioned components are preferably all encapsulated in at least one protective layer 26 which is relatively stable in pH neutral solutions, i.e., does not rapidly decompose when released into fresh water or sea water. This coating preferably also has pH-dependent solubility, different from that of delay layer 20, or is otherwise selectively broken down by digestive processes so as to selectively release its contents when reaching a first target area of the digestive tract of the target population of aquatic animals, such as the stomach region. Where the formulation is to be delivered to the aquatic animals as a stand-alone diet component, the formulation also includes a quantity of an appetite stimulant 28 associated with the formulation so as to be released in a controlled fashion into water surrounding the formulation. This may be achieved by admixing the appetite stimulant with an external layer of the formulation (such as aforementioned layer 26) or by providing a somewhat porous or soluble outer protective layer 30 through which the appetite stimulant 28 is released. Finally with respect to the overview of the formulation, one or more buoyancy modifying particles 32 are preferably included so as to provide the formulation with a buoyancy suited to the target population of aquatic animals. In certain typical implementations, the inherent density (specific gravity) of the formulation without buoyancy modifying particles would be slightly greater than that of water (around 1.05 g/ml), causing the formulation to sink. Buoyancy modifying particles 32 may encapsulate pockets of gas to increase buoyancy, or any other inert material (or nutrient if possible) which suitably modifies the buoyancy. One particularly preferred example of buoyancy increasing particles are hollow balls (referred to alternatively as "microspheres" or "bubbles"), preferably formed from glass, which contain gas. Such hollow balls are commercially available from 3M, Inc. under the tradename Scotchlite™ Glass Bubbles K series and S series. Various dimensions of glass bubbles may be used, typically in the range below 50 µM diameter, and most preferably no more than about 25 µm diameter. In some cases, the desired overall buoyancy is positive buoyancy, i.e., less dense than water, such that the formulation will float in water (location $a_1$ in FIG. 2). This option is generally suited in particular to feed for fish larvae. For other fish, the buoyancy is preferably chosen to be substantially neutral, i.e., with an overall density similar to that of water, so that the feed particles tend to remain suspended in the water (location $a_2$ in FIG. 2). For seawater (saline) aquaculture, the quantity of buoyant particles added is slightly reduced as a function of the salinity, thereby approximating to neutral buoyancy according to the relatively higher specific gravity of the salty water. In other cases, particularly for bottom-dwelling creatures such as shrimps, the desired density may be negative so that the formulation sinks to the bottom of the water.

Turning now to FIGS. 2 and 3A-3C, these illustrate the stages of delivery of various stimulants, nutrients and bioactive agents according to the preferred implementation of FIG. 1. As already mentioned, the formulation is delivered into the water where the aquatic animals are located and assumes a position within the water according to a designed level of buoyancy, typically either floating at the surface of the water as illustrated at $a_1$ or suspended in the water as illustrated at $a_2$. At this stage, as illustrated in FIG. 3A, the primary contents of the formulation which are to be delivered to the aquatic animals remain intact, protected by protective layer 26, while the appetite stimulant 28 is released either by diffusion through or dissolution of outer layer 30, thereby leading the aquatic animal to ingest the formulation.

After ingestion, the formulation is exposed to digestive fluids which breach protective layer 26, typically in the stomach or foregut region, thereby releasing nutritional substances 10, digestion enhancer 12 and any other contents immediately within layer 26 as illustrated in FIG. 3B. In the preferred two-stage-release implementation described above, delay layer 20 delays release of the at least one bioactive agent, preferably through pH-dependent solubility as mentioned above, for a time sufficient for the at least one bioactive agent to reach a second later stage of the digestive tract, typically the intestines or hindgut region. When the delay layer 20 is subsequently breached by exposure to the predefined pH conditions and/or a predefined delay after breaching of layer 26, and sealing layers 24 start to dissolve, the sticky coating 22 causes the capsules of bioactive agents 14, 16 and the local absorption enhancer 18 to adhere to the inner surface of the digestive tract before or during release of the bioactive agents as shown in FIG. 3C, thereby localizing the release of the bioactive agents in the region of absorption in the digestive tract.

At this stage, it will already be apparent that the present invention provides numerous advantages in a wide range of applications by enhancing delivery and absorption of nutrients and/or bioactive agents. Various specific functions and advantages, each corresponding to a subcombination of the aforementioned formulation which is considered to be useful in its own right, will be described further below.

Before going further, it will be useful to define certain terminology as used herein in the description and claims. Firstly, the terms "nutrient" and "nutritional substance" are used herein to refer to any and all substances which function primarily for providing energy, structural components, physiological cofactors, compounds and precursors which are a normal component of an aquatic animal's natural diet or a natural or artificial replacement for such a component. Such definition includes a wide range of proteins, lipids and carbohydrates, as well as various vitamins and minerals which are components of the aquatic animal's natural diet.

The term "bioactive agent" is used herein in the description and claims to refer to any non-nutrient (i.e., whose nutrient value is not its primary function) which is effective to enhance physiological performance of an aquatic animal. Bioactive agents thus defined include, but are not limited to: vaccines (e.g., vaccines such those used to treat BKD [Bacterial Kidney Disease]); growth enhancers (e.g., GH-Growth Hormone-IGF, GnRH etc.); gene promotor activators (e.g., cAMP for regulating the expression of the growth hormone gene of rainbow trout (Francesco Argenton et al., "A TGACG motif mediates growth-hormone-factor-1/pituitary-transcriptional-activator-1-dependent cAMP regulation of the rainbow trout growth-hormone promoter." *Eur. J. Biochem.* 238,591-598 (1996))); metabolism enhancers such as carnitine; and other bioactive agents for modifying other physiological and/or behavioral characteristics such as aggression or sexual function.

Reference is also made to "bioactive agent precursors". This term refers to a composition which can readily be used together with another composition, catalyst or activator to produce a bioactive agent. The option of using precursors rather than the desired bioactive agent itself is particularly useful in cases where the bioactive agent itself is relatively unstable, but can be stored and delivered in a relatively more stable precursor state. One non-limiting example of a bioactive agent advantageously delivered as a combination of precursors is Allicin, a broad spectrum antibiotic with additional antifungal properties that gives fresh garlic its reportedly medicinal characteristics. Allicin is itself extremely unstable, but can be delivered in the form of its precursor Alliin with parallel (but separate) delivery of the enzyme Alliinase (Miron et al., 2003; Cavallito et al., 1944). Thus, if Alliin is provided in capsule 14 and Alliinase in capsule 16, the two precursors are stored stably until reaching the target site where they are released, then reacting so as to hydrolize Alliin to generate very potent Allicin at the desired delivery location. Moreover, the capsules carrying the Allicin precursors can be designed to stick to each other, for example, by encapsulating one of the precursors in cationic liposomes and the other in anionic liposomes. Production techniques for both cationic and anionic liposomes are well known in the art, and will not be addressed here in detail. Consequently once the layers of their capsules have been hydrolyzed by digestive tract enzymes, the encounter and combination of the precursors to produce allicin becomes more efficient.

Reference is made herein in the description and claims to digestion enhancing compositions effective to trigger a cascade reaction enhancing digestion along a major part of the digestive tract of the aquatic animal. The term "cascade reaction" is used herein to refer to a causal sequence of systemic endocrine events triggered by the digestion enhancing composition which lead to heightened activity or otherwise improved efficiency of the digestive processes. Non-limiting examples of a digestion enhancing compositions effective in many fish for triggering such a cascade reaction are domperidone (DOM) and certain free amino acids. Since the events are systemic in nature, i.e., involving the endocrine system of the animal, they typically affect substantially the entirety, or at least a major part, of the digestive tract. As a result, such compositions may be helpful for enhancing digestion of nutrients as well as absorption of bioactive agents, even when they occur in different parts of the digestive tract. Similarly, digestion enhancing compositions of this type, when released at one area within the digestive tract, may influence absorption of bioactive agents at a later time and in a different area altogether of the digestive tract.

In contrast to cascade reaction triggers, reference is also made to "local absorption enhancers". These are compositions which have a localized direct effect, such as by rendering the lining of the digestive tract more permeable to large molecules. A non-limiting example of a local absorption enhancer believed to be effective in a wide range of fish is deoxycholic acid (DOC) (Ben-Atia, I., M. Fine, A. Tandler, B. Funkenstein, S. Maurice, B. Cavari, A. Gertler (1999) Preparation of recombinant gilthead seabream (*Sparus aurata*) growth hormone and its use for stimulation of larvae growth by oral administration. Gen. Comp. Endocrinol. 113(1):155-64).

The term "layer" is used generically to refer to layers of encapsulation, whether the layers are self-supporting membranes or capsules, or whether they are coating layers applied directly to the underlying material. Techniques for rendering the various layers pH-dependent in their solubility (according to preferred implementations as mentioned above) are well known in the field of multi-dose medications for drug delivery in humans and will not be addressed here in detail.

Turning now to further details of the formulations of the present invention, reference will also be made to various subcombinations which are considered of particular importance in their own right. Thus, it should be noted that a solely food formulation, i.e., without any bioactive agents, also falls within the broad scope of one aspect of the present invention. Such an implementation would include at least one encapsulated nutritional substance 10, encapsulated digestion enhancing composition 12 effective to trigger enhancement of at least one digestive process in the aquatic animal, and at least one protective layer 26, 30. The presence of the digestion enhancing composition ensures that, when the digestion enhancing composition and nutritional substance are released at the appropriate target location within the aquatic animals, the digestion enhancing composition enhances absorption of the at least one nutritional substance.

Preferred examples of the digestion enhancing composition include, but are not limited to, free amino acid (FAA's), domperidone (DOM), polar lipids and free fatty acids.

According to an alternative subcombination implementation believed to be significant in its own right, an encapsulated digestion enhancing composition 12 effective to trigger a cascade reaction enhancing digestion along a major part of the digestive tract of the aquatic animal may be used advantageously to enhance absorption of a bioactive agent 14, 16, even in a purely bioactive formulation which does not include nutrients. Here too, the formulation is preferably encapsulated by at least one protective layer 26, 30. As in the other implementations discussed herein, the composition may be provided with appetite stimulant 28 to render them directly attractive to the aquatic animals for ingestion, or alternatively may be included with other conventional foodstuffs directly, for example as small particle additives to food flakes, pellets and the like.

According to a still further subcombination implementation believed to be significant in its own right, a formulation is provided for delivering two or more bioactive agent precursors to a desired area of the digestive tract where they are released and react to generate a bioactive agent on site.

According to a still further subcombination implementation believed to be significant in its own right, a formulation is provided for delivering a bioactive agent to a desired area of the digestive tract where it is released together with a quantity of deoxycholic acid (DOC) as a particularly effective local absorption enhancer.

As mentioned above, each implementation which is delivered "free-standing", i.e., not in combination with other foodstuffs, preferably includes appetite stimulating composition 28 associated with one of protective layers 26, 30 so as to be released into water surrounding the food formulation, thereby encouraging ingestion of the food formulation by the aquatic animal. Any composition known to be effective as an appetite stimulant, i.e., which attracts the relevant type of aquatic animal or otherwise induces ingestion, may be employed. According to one particularly preferred set of implementations, appetite stimulating composition 28 includes at least one free amino acid (FAA), at least one polar lipid, and/or at least one free fatty acid. Appetite stimulant 28 may be dispersed within an outermost protective layer (for example, layer 26, where layer 30 is omitted). Alternatively, appetite stimulant 28 may be located internally with respect to an outer layer 30 through which it is released in solution. In certain cases, the same composition (such as certain FAA's) may serve both as appetite stimulant 28 and as a digestion enhancer 12. In such a case, a suitably positioned quantity of the digestion enhancer 12 with an arrangement for slow release through layer 26 may replace the need for two separate encapsulations.

Figure 4A:
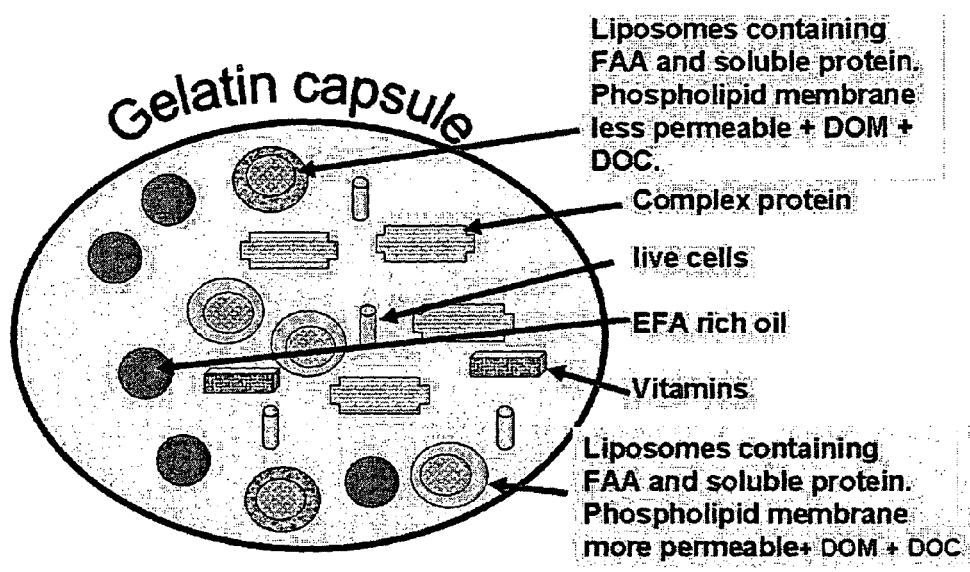
FIG. 4A is a schematic representations of a specific implementation of an encapsulated sub-unit for implementing the formulation of FIG. 1.
Figure 4B:
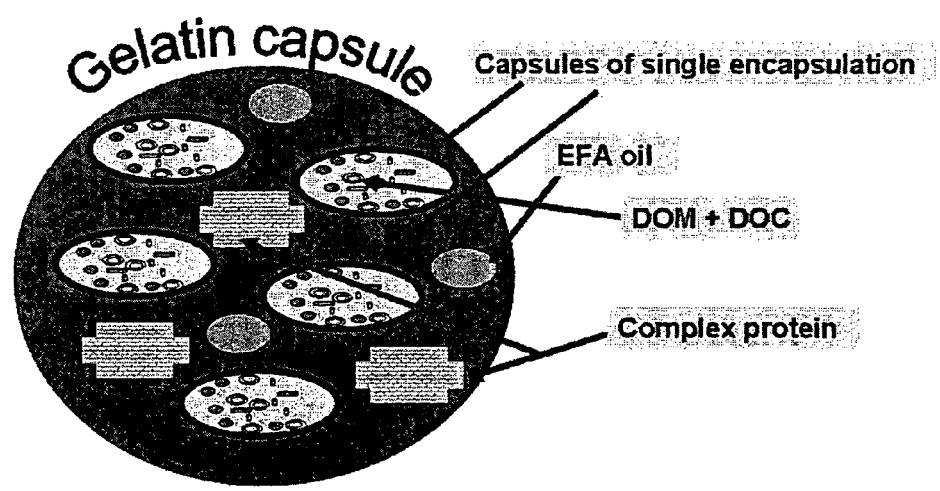
FIG. 4B is a schematic representation of an encapsulated food formulation, constructed and operative according to the teachings of the present invention, including a plurality of the sub-units of FIG. 4A.

The particle size of the formulations according to the present invention may be anywhere in the range from 10 to 1000 microns (referring to the outer diameter or largest dimension of the particles). Control of the overall size is typically achieved by use of double encapsulation as will be illustrated in the examples below, wherein successive layers of encapsulation successively add more ingredients in each particle and lead to larger particle size. For a free-standing feed for fish larvae, particle sizes in the range of 50 to 450 microns are typically preferred. An example of such a double-encapsulated larval feed is illustrated in FIGS. 4A and 4B wherein FIG. 4A shows a sub-unit after single encapsulation and FIG. 4B shows a double-encapsulated formulation including multiple sub-units of FIG. 4A as well as other desired substances.

It should be noted that the two-stage release of nutrients and/or digestion enhancer followed by bioactive agents is preferred for certain application, but is not essential. Particularly in the case of younger or more primitive aquatic animals which do not have a distinct stomach in their digestive tract, single stage release may be preferred. In such cases, delay layer 20 is omitted such that the desired combination of nutrients, digestion enhancer, local absorption enhancer and/or bioactive agents are released in roughly the same region of the digestive tract. Even in a single-stage release formulation, sticky coatings 22 may optionally be used to advantage.

A preferred implementation for sticky coatings 22 employs a coating of charged lipids such as in cationic liposomes, although other biocompatible adhesive materials may be used.

EXAMPLES

The following examples are provided by way of illustration but should not be considered in any way to limit the present invention.

According to a first preferred example, the invention is implemented with an outer gelatin capsule (200-450 μm) which is stable in neutral freshwater or seawater. In one example, the product was encapsulated in a matrix of gelatin and Acacia gum which allows the formulation of soft and buoyant capsules that are acceptable to larvae. In addition by using various gelatins that dissolve at different levels of pH, the capsule can release its contents in different regions of the digestive tract which have a characteristic pH. This allows the optimization of the capsule for a given aquatic species and developmental stage. In addition, double encapsulation is used to arrive at optimal size and superior buoyancy characteristics and to increase the size of the capsules, thereby rendering them appropriate for feeding fish larvae.

The outer gelatin capsule contains Free Amino Acids (FAA) whose release can be regulated. Encapsulation of Free Amino Acids (FAA) such as glycine, alanine, arginine, as well as betaine, have been shown to be appetite stimulants secreted by *Artemia nauplii*, which is the main live food used in aquaculture worldwide.

The outer gelatin capsule can be digested at the lower pH (relatively acidic) environment of the gastric area to release the contained dispersed nutrients and compounds in the upper digestive tract or digested at a higher pH to release contained nutrients and compounds in the lower digestive tract. The dispersed nutrients and compounds satisfy the nutritional requirements of the animal such as essential lipids, minerals and vitamins, complex soluble and hydrolyzed proteins and/or provide physiological stimulants, absorption enhancers and therapeutic agents. In accordance with an aspect of the present invention, soluble and hydrolyzed proteins as well as specific Free Amino Acids (FAA) and free fatty acids (FFA) improve the digestion and assimilation of nutritive compounds in the digestive tract. Specifically, it has been found that, by encapsulating certain Free Amino Acids (FAA) in liposomes, and ensuring their ingestion in the fish larvae it is possible to trigger a cascade of physiological processes culminating in improved digestion and absorption.

Experiment I

Enhanced Assimilation of Nutrients

The enhancement of assimilation of nutrients is illustrated in the following experiment, applied to twenty-two glass beakers in a flow through, aerated experimental system, stocked with 50 gilthead seabream larvae, 26 days after hatch per beaker. Two radioactive microdiets (MDs) were produced; where their neutral lipid fraction included equal amounts of $^{14}C$ glycerol trioleate (triacylglycerol) and were identical in levels of protein, lipid, carbohydrate, vitamins, and minerals. However, the two MDs differed in that their liposome component contained either distilled water in the control, or selected aliphatic and aromatic FAA (in this case: valine, leucine, and isoleucine, tryptophan, phenylalanine in the ratio 1:1:1:1:2). Phenylalanine was included at twice the level of the other FAA as this FAA is believed to particularly stimulate CCK secretion, although the specific ratio used was not necessarily optimized. A third treatment, was tested as the radioactive blank and was identical to FAA containing treatment but did not contain any radioactive label. Each MD was fed in 4 equal rations to larvae, in five replicate beakers per treatment, for one hour, where the uneaten food in the beakers was then siphoned out and the larvae resuspended in fresh seawater. The larvae were then left to digest their meal and after 3 h the larvae from five beakers from each treatment were sampled and after a further 5 h the larvae from another 5 beakers from each treatment were sampled. Experimental results presented below as FIG. 5 show an increase in the label in the mostly protein and polar lipid (predominantly membrane lipid) fraction which could accumulate in these fractions only after digestion and absorption of the triacylglycerol dietary label. The level of radioactivity in these fractions is expressed as μg MD equivalent. The higher the level of accumulated label in these fractions implies improved digestion of the radioactive triacylglycerol in the diet.

The inner capsules (50-150 μm) arrive at intestine and contain vitamins, nutrients, live cells, and factors which enhance absorption, either mixed or within a lipid membrane, as well as additional liposome carriers made of a cationic lipid membrane containing bioactive macromolecules.

Experiment II

Gut Adhesion for Enhanced Localized Delivery

A further preferred aspect of the present invention is demonstrated in the following example whereby electrical surface charge is used as a docking tool to bring liposomes (carrying drugs, vaccines, etc.) into the vicinity of the epithelium of the fish intestine.

Adhesion of neutral and cationic liposomes to the gastric mucosa of adult gilthead seabream (*Sparus aurata*) is illustrated in the following experiment carried out by the inventors. Two radioactive and one non-radioactive batch of liposomes were prepared: a) a 140 mg batch of neutrally charged liposomes was produced by first adding 10 μCi of $^{14}$C-free stearic acid to hydrogenated phosphatidylcholine (PC) and cholesterol (CHOL) at a ratio of 10:4 (w/w). A lipid film of these components was produced followed by agitation and hydration with 7 ml of Ringer solution, which produced multilamellar lipid vesicles (MLV). The MLVs were then extruded through a 0.6 μm filter to produce single lamellar vesicle (SLV) liposomes. b) $^{14}$C-Cationic liposomes were similarly prepared but the cationic lipid dimethyldioctadecyl ammonium bromide (DODAB) was added to the PC and CHOL at 30 mol % of total lipid. c) A third batch of non-radioactive neutral liposomes was also prepared.

The experimental design consisted of three rows of 12 test tubes. In the first row 12 test tubes tested the control and treatment liposomes with five replicate tubes each while 2 tubes were used as non-radioactive blanks. In 10 test tubes of the first row 9 ml of Ringer solution were added together with 1 ml of $^{14}$C-labeled control or cationic liposomes. The remaining two test tubes were non-radioactive blanks where 9 ml of Ringer solution and 1 ml of non-radioactive neutral liposomes were added. The 12 test tubes with their respective liposome suspensions were maintained at room temperature to ensure full mucosa function for the duration of the experiment. For each test tube in the first row there was an associated pair of test tubes in the second and third row for washing the DT sections and contained 10 ml of Ringer solution cooled to 4° C. in order to severely reduce or stop mucosa function. Twelve approximately 1 cm square sections of anterior digestive tract, each dissected at an equal distance from the gastric sphincter, from 100 g gilthead seabream (*Sparus aurata*) were fitted on to 10 cm stainless steel rods and inverted so that the mucosa side was outward. The sections were tied to the rods using ligatures and placed in cold Ringer's solution at 4° C. The twelve rods and their DT tissues were then placed in the twelve test tubes with their respective liposome suspensions for 30 min at room temperature. During this period the liposome suspension was gently agitated with the rods every 5 min. At the end of 30 min the rods and tissue sections were transferred from the first test tube row and gently washed in the associated pair of test tubes in the second and third row in cold Ringer solution.

After the above washing procedure of the inverted pieces of the seabream guts, the ligatures were cut and the sections placed in pre-weighed vials and dried at 60° C. for 24 h. After weighing the dried tissues and the determination of their dry weight, the tissues were completely solubilised over 24 h at 50° C. using Soluene 350 followed by adding scintillation cocktail and the dpm of the tissue measured in a scintillation counter. The specific activity (dpm/μg) of the control and treatment liposome suspensions was also determined which allowed the expression of the adherence results in μg liposome/mg dry weight of DT tissue.

A significant increase in adherence of cationic liposomes compared to neutral liposomes to the mucosa of the digestive tract is presented in FIG. 7.

Accordingly, liposomes are provided where, upon directed arrival to the intestinal area, the exposed surface of the liposomes adhere to the mucosa to improve the absorption of its content of bioactive materials and facilitate their transfer, after disintegration of the liposome membrane, to the circulation system. Liposomes that do not adhere to the mucosa may display less than ideal absorption behavior near their main absorption site and/or may be over exposed to the hydrolytic effects of digestive enzymes in the lumen.

Experiment III

Effect of Absorption Enhancers

According to another preferred aspect of the present invention, the formulations include absorption enhancers. It was found that, by including DOC and/or DOM, it is possible to enhance absorption of bioactive macromolecules. This increase in absorption and resulting penetration into blood, is illustrated in the following cannulation experiment.

Rainbow trout of a weight range of 750-1700 g (Spring Valley Trout Farms, Langley, BC) were immunized against firunculosis and vibriosis by injecting them with 0.2 ml fish$^{-1}$ of a 1:1 ratio of VIBRIOGEN and FUROGEN (Microtek, BC, Canada), and stocked in 4,000 liter tanks. The tanks were supplied with well water at a temperature of 10±0.5° C. at about 10 exchanges per day. After 10 days fish were transferred gradually over a period of another 10 days to full strength seawater (25-29 ppt). The temperature of the seawater ranged between 7-9° C. according to season. Only following their acclimation to seawater, after another 10 days, were fish used. During these periods, fish did not lose their appetite. Fish were fed daily about 1% BW of a 42% protein and 33% crude fat diet (Moore-Clark Co., Canada).

Fish were kept individually in 200 1 fiberglass tub aquaria. Fish in the tanks were confined to one half of the tank with a partition. This ensured that the cannula did not get tangled on objects in the tanks as the fish were swimming. In addition, fish were encouraged to swim against a current, which was generated by a pipe which directed the water inflow to the surface of the tank. The experimental fish were not fed within a given experiment, which normally lasted for 5 days, and were force fed once a week with a 0.5% body weight of a Moore Clark "Royal extrude salmon feed" (42% C.P., 33% C.F.), which was mixed with water at a 1:1 ratio to give a paste which could be intubated into the fish.

Fish were anesthetized in two stages. They were first sedated in metomidate hydrochloride (Marinil, Wildlife laboratories Inc. CO, USA) in a 250 ppb solution in the 4000 liter holding tanks with the water supply turned off. Fish were netted out of the 4,000 liter tanks into 15 liter of well aerated 100 ppm MS222 (3 amino benzoic acid ethyl ester; SIGMA) solution in SW for a deeper anesthesia. Fish were sedated until active gill ventilation ceased at which point they were taken out of the water, weighed and cannulated.

Samples were taken of blood to determine plasma cortisol or hCG. Blood sampling was done in two stages: First a volume equal to the dead volume of the cannula (~250 μl) was withdrawn and discarded, this was followed by sampling 250-500 μl blood, depending on the RIA assay (cortisol or hCG), into a 1 ml EDTA-Aprotinin coated syringe. The blood samples were kept in 500 μl Eppendorf tubes on ice for up to two hours within which time the tubes were centrifuged at 13,000 rpm for 5 min. The supernatant plasma was removed by disposable Pasteur pipettes into Eppendorff tubes and stored at −40° C. until the RIA. When blood samples were taken for hCG analysis they were centrifuged for 5 minutes at 3750 rpm at 5° C.

To measure plasma cortisol, 20 µl of plasma was applied to a kit by INCSTAR (Minnesota, USA). No significant cross-reactivity of this kit was found with dexamethasone (9α-Fluoro-16α-Methyl Predindone, SIGMA), while it crossreacted with cortisol (hydrocortisone; SIGMA), which was used in the clearance rate experiments. Porcine ACTH (SIGMA) which was used for the intubation study elicited a cortisol response in fish but could not be detected reliably by the cortisol RIA. Plasma hCG was also determined based on a RIA (INCSTAR) kit and of the orally applied hCG based on Van der Kraak et al. (1984). ACTH stimulates cortisol production in the interrenal cells of the kidney.

There was a direct correlation between the level of DOM accompanying an oral dose of ACTH of 0.5 mg.kg$^{-1}$ and the level of plasma cortisol. This response depended on fish weight in the range of 800-1600 g. Cumulative plasma cortisol, over a 360 min. period, quadrupled (P<0.05), from 1086 to 4329 ng kg$^{-1}$ as DOM increased from 0 to 4.5 mg kg$^{-1}$. The response of plasma cortisol to the level of DOM as well as to fish weight can be best described by the following equation:

Cortisol=1.807*DOM0.219*Fishwt1.03 ($R2$=0.8867, $P$<0.015)

where cortisol is cumulative plasma cortisol per kg, DOM is the domperidone dose in mg kg$^{-1}$, and Fishwt is in g. Cumulative cortisol synthesis in response to ACTH was directly correlated with the molar concentration of DOC in the intubation medium (PBS). Thus, as the molar concentration of DOC increased from 0 to 0.0167 so did the cumulative response of cortisol to plasma ACTH increase (P<0.05) from 1454±597 to 7042±3243 ng cortisol kg$^{-1}$, respectively.

Peak plasma levels of hCG, following oral administration at 250 mIU hCG kg$^{-1}$, in the presence of DOM and DOC, were obtained 60 min. after intubation. The magnitude of the peaks depended on the gut modulator, being 204±74 mIU kg$^{-1}$, when hCG was intubated in the presence of both 1.5 mg kg$^{-1}$ DOM and a 0.05 molar solution of DOC in PBS saline. This was significantly higher (P<0.05) than the plasma hCG level in fish treated with the same dose of 250 mIU hCG in the presence of either DOM or DOC alone. Similarly, the rate of increase in plasma hCG in the course of the 360 min. experiments was 1.65 mIU min$^{-1}$ in rainbow trout which were intubated with hCG in the presence of the two gut modulators as shown in Table 1. This was about 4 times higher (P<0.05) than any treatment of fish with DOM or DOC when given individually. In contrast, control fish which were intubated with 250 IU kg$^{-1}$ in the absence of gut modulators did not show any marked increase in plasma hCG.

Thus, both agents (DOC and DOM) quadrupled gut penetrability to ACTH as it was reflected by plasma cortisol. However, hCG penetration was maximal when both gut modulators were administered simultaneously. Under these conditions the rate of gut penetration to hCG was 90×10$^{-3}$% min$^{-1}$ of the intubated dose which is 40 times higher than the rate of penetration in the gold carp. On the other hand, the peak plasma hCG 60 min. after administration was only 0.09% of the intubated dose as compared to 2-6% in cyprinids. The difference between the penetration efficiency between cyprinids and salmonids, which is often quoted to be 1000 fold higher for the former, may reflect an augmented clearance rate in salmonids. Thus, potential use of such gut modulators as DOC and DOM in modulating gut penetrability to bioactive macromolecules in salmonids is of considerable aquacultural potential.

Therefore, in accordance with an aspect of the present invention, two modulators of gut membrane integrity: deoxycholic acid (DOC), a bile salt, and domperidone (DOM), a modulator of peristalsis due to antidopaminergic and procholinergic action, are entrapped in inner capsules of the polyencapsulated particle and release in the intestine This novel polyencapsulated particle is suitable for improved growth and health management of aquatic animals and represent an advancement in the science of improved fish growth in commercial hatcheries.

TABLE 1

The effect of gut integrity and motility modulators on the regression parameters of the temporal cumulative changes in plasma hCG (mIU kg$^{-1}$ min$^{-1}$) in rainbow trout (*Oncorhynchus mykiss*).

| Treatment | N | Intercept ± SE | Slope ± SE |
|---|---|---|---|
| DOM** | 2 | 11.71 ± 33.16 | 0.045 ± 0.21$^{b*}$ |
| DOC*** | 4 | 11.25 ± 23.85 | 0.46 ± 0.22$^b$ |
| DOM + DOC | 2 | 139.32 ± 104.38 | 1.65 ± 0.41$^a$ |

*Means having the same superscript are not significantly different from each other (P > 0.05).
**Domperidone (DOM) was given orally at 1.5 mg kg$^{-1}$
***Deoxycholic acid (DOC) was given at 0.05 Molar solution in PBS It will be appreciated that the above descriptions are intended only to serve as examples, and that many other embodiments are possible within the scope of the present invention as defined in the appended claims.

What is claimed is:
1. A food formulation for aquatic animals comprising:
(a) at least one encapsulated nutritional substance;
(b) an encapsulated digestion enhancing composition effective to trigger enhancement of at least one digestive process in the aquatic animal,
wherein said nutritional substance and said digestion enhancing composition are encapsulated in at least one protective layer so as to protect said nutritional substance and said digestion enhancing composition until said nutritional substance and said digestion enhancing composition reach a designated area of the digestive tract of the aquatic animal, said digestion enhancing composition and said at least one nutritional substance then being released and said digestion enhancing composition thereby enhancing absorption of said at least one nutritional substance;
(c) a sticky coating of charged lipids said sticky coating is encapsulated by said at least one protective layer, said sticky coating is associated with at least part of quantity of bioactive agent other than said nutritional substance and said digestion enhancing composition, said sticky coating being configured such that, when exposed, said sticky coating tends to adhere to an internal surface of the digestive tract, thereby localizing release of said at least part of said quantity of bioactive agent;
(d) a delay layer encapsulating said sticky coating, said delay layer being configured to delay exposure of said sticky coating after breaching of said protective layer such that said at least one nutritional substance is released prior to exposure of said sticky layer;
(e) an outer protective layer, wherein said outer protective layer is external to said protective layer; and
(f) at least one buoyancy modifying particle confined by said protective layer, said buoyancy modifying particle being chosen such that said food formulation exhibits neutral buoyancy such that said food formulation remains suspended in water.

2. The food formulation of claim 1, wherein said nutritional substance and said digestion enhancing composition are both enclosed in at least one common encapsulating layer.

3. The food formulation of claim 1, wherein said digestion enhancing composition comprises at least one free amino acid.

4. The food formulation of claim 1, further comprising an appetite stimulating composition associated with said protective layer so as to be released into water surrounding the food formulation, thereby encouraging ingestion of the food formulation by the aquatic animal.

5. The food formulation of claim 4, wherein said appetite stimulating composition comprises at least one free amino acid.

6. The food formulation of claim 4, wherein said appetite stimulating composition is embedded within said protective layer, or confined by said layer.

7. The food formulation of claim 1, wherein the maximal width of the formulation including said protective layer, is in the range between 10 and 1000 microns.

8. The food formulation of claim 1, wherein said at least one buoyancy modifying particle includes a hollow glass ball.

9. The food formulation of claim 1, wherein said digestion enhancing composition further comprising domperidone (DOM).

10. The food formulation of claim 1, wherein said digestion enhancing composition triggers a cascade reaction enhancing digestion along a major part of the digestive tract of the aquatic animal, thereby enhancing absorption of said bioactive agent.

11. The food formulation of claim 1, wherein said digestion enhancing composition including but not restricted to the group consisting of: valine, leucine, isoleucine, tryptophan, and phenylalanine, or combination thereof, operable to improve the digestion and assimilation of nutritive compounds.

12. The food formulation of claim 1 further comprising a local absorption enhancer for enhancing transport of said bioactive agent through a wall of the digestive tract.

13. The food formulation of claim 12, further comprising sticky coatings of charged lipids associated with each of said bioactive agent and said local absorption enhancer, said sticky coatings being configured such that, when exposed, said sticky coatings tend to adhere to an internal surface of the digestive tract, thereby localizing release of said bioactive agent and said local absorption enhancer.

14. The food formulation of claim 13, further comprising at least one delay layer encapsulating said sticky coatings, said at least one delay layer being configured to delay exposure of said sticky coatings after breaching of said protective layer such that said nutritional substance is released prior to exposure of said sticky coatings.

15. The food formulation of claim 1, further comprising a delay layer encapsulating said bioactive agent, said delay layer being configured to delay release of said bioactive agent such that said digestion enhancing composition is released at a first area within the digestive tract and said bioactive agent is released subsequently at a second area within the digestive tract.

16. A bioactive formulation for aquatic animals comprising:

(a) at least one encapsulated bioactive agent and a sticky coating of charged lipids associated with at least part of said bioactive agent, said sticky coating being configured such that, when exposed, said sticky coating tends to adhere to an internal surface of the digestive tract, thereby localizing release of said at least part of said quantity of bioactive agent; and (b) an encapsulated digestion enhancing composition effective to trigger a cascade reaction enhancing digestion along a major part of the digestive tract of the aquatic animal, wherein said bioactive agent and said digestion enhancing composition are encapsulated in at least one protective layer so as to protect said bioactive agent and said digestion enhancing composition until said bioactive agent and said digestion enhancing composition reach a designated area of the digestive tract of the aquatic animal, said digestion enhancing composition then being released and thereby enhancing absorption of said bioactive agent; and (c) at least one buoyancy modifying particle confined by said protective layer, said buoyancy modifying particle being chosen such that said bioactive formulation exhibits neutral buoyancy such that said food formulation remains suspended in water.

17. The bioactive formulation of claim 16, wherein said encapsulation of said bioactive agent includes a delay layer configured to delay release of said bioactive agent such that said digestion enhancing composition is released at a first area within the digestive tract and said bioactive agent is released subsequently at a second area within the digestive tract.

18. The bioactive formulation of claim 17, wherein said encapsulation of said bioactive agent further includes a sticky coating of charged lipids initially disposed under said delay layer, said sticky coating being configured such that, when exposed, said sticky coating tends to adhere to an internal surface of the digestive tract, thereby localizing release of said bioactive agent.

19. The bioactive formulation of claim 16, further comprising a local absorption enhancer for enhancing transport of said bioactive agent through a wall of the digestive tract.

20. The bioactive formulation of claim 16, further comprising at least one nutrient present in sufficient quantity to render the bioactive formulation of nutritional value to the aquatic animal.

21. The food formulation of claim 1, said food formulation is a sub-unit in a double-encapsulated formulation.

22. The food formulation of claim 11, wherein phenylalanine is at least twice the amount of any other amino acid.

23. The food formulation of claim 11, wherein valine, leucine, isoleucine, tryptophan, and phenylalanine, are present in a ratio of 1:1:1:1:2, respectively.

24. The food formulation of claim 1, wherein said sticky coating is liposome coating.

25. A bioactive formulation for aquatic animals comprising: (a) at least one encapsulated bioactive agent; and (b) an encapsulated quantity of deoxycholic acid (DOC) and domperidone (DOM), wherein said bioactive agent and said quantity of DOC and DOM are encapsulated in at least one protective layer so as to protect said bioactive agent and said quantity of DOC and DOM until said bioactive agent and said quantity of DOC and DOM reach a designated area of the digestive tract of the aquatic animal, said quantity of DOC and DOM then being released.

* * * * *